May 9, 1967   M. J. JOHNSON ETAL   3,319,164
CALIBRATION DEVICE FOR ELECTRIC TACHOMETERS
UTILIZING A RESONANT REED INDICATOR
Filed July 10, 1964   2 Sheets-Sheet 1

*INVENTORS*
*Myron J. Johnson*
*Marshall Miles*

INVENTORS
Myron J. Johnson
Marshall Miles

United States Patent Office 3,319,164
Patented May 9, 1967

3,319,164
CALIBRATION DEVICE FOR ELECTRIC TACHOMETERS UTILIZING A RESONANT REED INDICATOR
Myron J. Johnson, Arlington Heights, and Marshall Miles, Wilmette, Ill., assignors to Stewart-Warner Corporation, Chicago, Ill., a corporation of Illinois
Filed July 10, 1964, Ser. No. 381,804
5 Claims. (Cl. 324—70)

This invention relates in general to electric tachometers used for indicating engine speed and more particularly to an improved arrangement for calibrating electric tachometers of the type driven by the alternator of an engine for indicating the engine speed.

Electric tachometers for use in indicating engine speed must receive signals that correspond exactly to the engine speed. While it is possible to do this by driving the tachometer directly from the ignition system, this type of arrangement results in either loading the ignition system excessively or necessitates a comparatively expensive arrangement in which power is supplied from the battery for amplifying signals from the ignition system. In order to avoid this, it is a practice to provide a special generator to drive the tachometer since the ordinary generator delivers an unsuitable direct current output or to drive the tachometer from an alternator. Tachometers driven by an engine alternator are comparatively inexpensive and may be used with a wide range of alternators. These have, therefore, found considerable favor among automobile owners.

In the case of vehicles utilizing alternators, the ratio between the alternator and engine speed is not generally known to the owner. Therefore, if the owner of a vehicle equipped with an alternator desires to use an electric tachometer in his vehicle, he must have some means for comparing the signal frequency from the alternator with a frequency having a known relationship to engine speed to calibrate his tachometer in accordance with his engine speed, It is therefore, an object of the present invention to provide a calibration arrangement of use with an electric tachometer adapted to be driven by an alternator.

It is still another object of the present invention to provide an improved electric tachometer for use with an alternator.

It is another object of the present invention to provide an improved or more economical arrangement for calibrating an electric tachometer.

In order to accomplish the above objects of the present invention, an unusually simple and effective technique is employed. Thus, the calibration arrangement comprises a reed having a known resonant frequency and carried within the tachometer housing. The reed is adapted to be pulsed by low power signals from the ignition system of the engine of the vehicle on which the electric tachometer is installed. The signals from the ignition system, of course, correspond exactly to the engine speed so that the reed is pulsed at a rate corresponding exactly to the engine speed. Simultaneously, signals from the alternator are applied to the tachometer to move the needle of the tachometer according to the alternator speed. When the engine speed reaches a value corresponding to the resonant frequency of the reed, the reed vibrates at a greatly increased amplitude, thereby indicating this condition. The tachometer needle is then observed and, if its position does not correspond to the known frequency indicated by the vibrating resonant reed, a simple potentiometer adjustment serves to bias the tachometer needle into a position corresponding to the known resonant reed frequency so that the needle truly indicates the engine speed. Thereafter, the connections for pulsing the reed are rendered ineffective so that even the low power necessary to pulse the reed is not withdrawn from the ignition system.

Since it is also necessary to calibrate the reed to ensure that it resonates at the desired frequency, it is another object of the present invention to provide an improved reed and arrangement for adjusting the resonant frequency of a reed to be used for calibrating an electric tachometer.

In order to calibrate the reed so that it resonates at the desired frequency, whether the reed is used for calibrating the tachometer as part of the original vehicle equipment or as accessory equipment purchased subsequently by the vehicle owner, an unusual reed and adjustment construction are employed. Thus, the reed comprises a single V-shaped wire element having its largest mass segment at the leg juncture. The leg ends are adjustably movable through clamping screws to adjust the free length of the legs for coarse adjustment of the resonant frequency of the reed. The screws are also arcuately adjustable on their mounting bracket to vary the angle between the reed legs and thereby secure a fine adjustment of the resonant frequency.

Other objects, features and advantages of the invention will become apparent upon examination of the following specification and claims, together with the drawings wherein:

Figure 1:
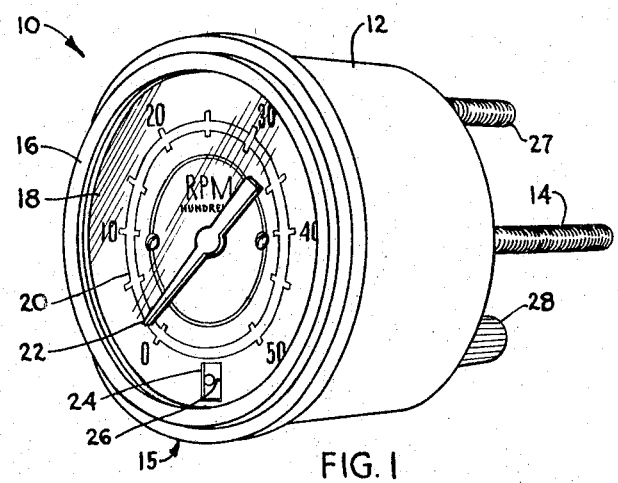
FIGURE 1 is a perspective view of an electric tachometer incorporating the principles of the present invention.

In FIGURE 1 an electric tachometer incorporating the principles of the present invention is generally indicated by the reference character 10. The tachometer 10 comprises a cup shaped housing 12 and mounting studs such as 14 seen at the rear of the housing 12. The studs 14 enable the tachometer to be installed in an automobile, for example, generally adjacent or in the dash board panel or adjacent the steering column where it may be easily viewed.

Figure 2:
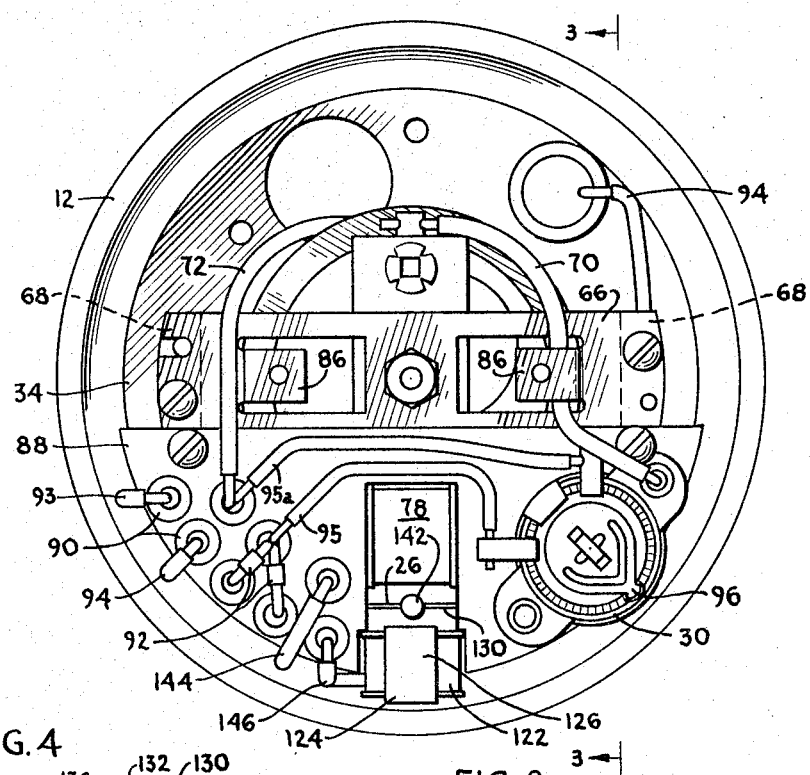
FIGURE 2 is a front end view of the tachometer with the dial and face plate assembly removed.

A dial and face plate assembly 15 is provided at the front of the housing 12, and it comprises a bezel 16 for conventionally securing a glass plate 18 to the housing 12. A dial or face plate 20, graduated in increments corresponding to revolutions per minute in hundreds, is seen through the glass plate 18 and a needle 22 is adapted to be rotated past the dial increments for indicating the engine speed on the dial. A window 24 is provided adjacent the lower end of the vertical axis of the dial 20 and a reed 26, having a known resonant frequency for use in calibrating the tachometer, is visible through the window 24. An adjustment knob 28, seen at the rear of the housing 12, is provided for adjusting a potentiometer 30, seen in FIGURES 2 and 3, in order to properly position the needle 22 in relation to the dial 20 when the reed 26 is vibrated at its resonant frequency, as will be explained. Electrical connections to the tachometer 10 are established by means of studs such as 27 seen at the rear of housing 12 or other suitable connecting means.

Figure 3:
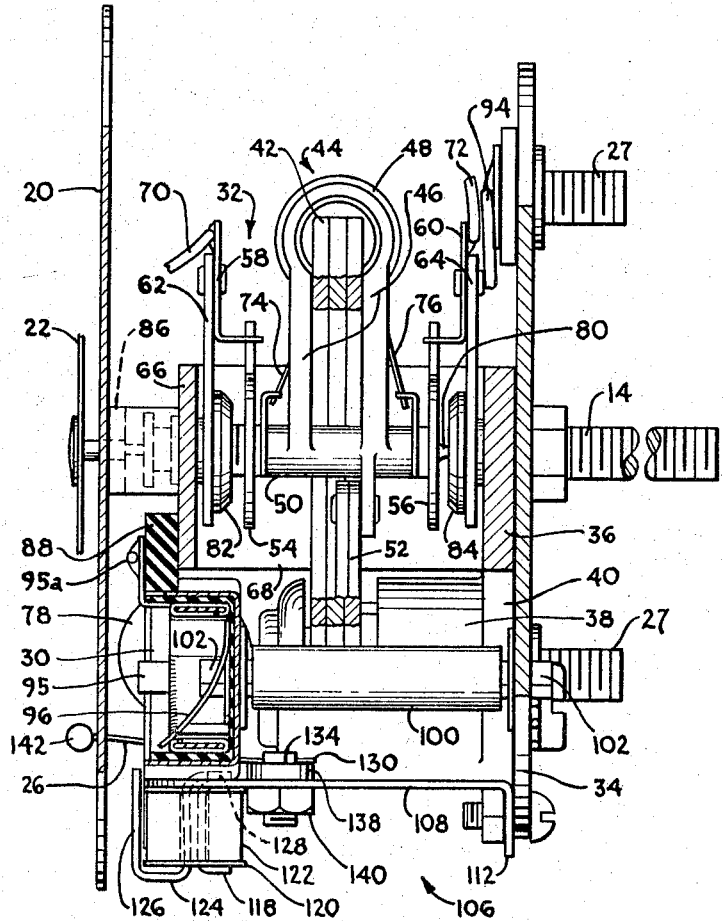
FIGURE 3 is a partial sectional view of the tachometer taken generally along the line 3—3 in FIGURE 2 with the needle movement shown in an operated position and a portion of the meter assembly shown broken.

As best seen in FIGURE 3, the tachometer 10 includes a meter movement or assembly 32 of the type shown in application Ser. No. 254,070, now U.S. Patent Number 3,181,064, filed by Wargo, although other meter assemblies, such as shown in Patent No. 3,005,951 issued to Gersch, may also be used. The meter assembly 32 is adapted to respond to electrical signals for controlling the needle 22 to sweep across the dial and indicate the rate at which the signals are supplied. The assembly 32 comprises a disc-shaped magnetic frame member 34 carrying the mounting studs 14 and a U-shaped die cast bracket 36. A hollow post 38, protruding from the back leg 40 of the bracket 36, carries a permanent magnet structure as described in the aforementioned application or patent and cooperates with the magnetic frame member 34 and an arcuate pole piece structure 42 to control the movement of a coil assembly 44.

The coil assembly 44 comprises a pair of spaced apart standards 46 supporting a coil 48 and extending from a tubular shaft 50. The core of the coil 48 is formed by the arcuate pole piece structure 42. The coil 48 is adapted to move along the arc described by pole piece 42 in response to the relationship between the field generated by electrical signals applied to the coil 48 and the field of pole piece structure 42 to thereby rotate the shaft 50. A counterweight 52 is also supported by the shaft 50, which is normally biased by a pair of spaced apart torsion springs 54 and 56 to bring the coil 48 into a position generally adjacent to that occupied by weight 52 in FIGURE 3.

The torsion springs 54 and 56 each have one end fixed to shaft 50 and have their other ends fixed to terminals 58 and 60, respectively, carried by respective insulating cards 62 and 64. The card 64 is carried adjacent the back leg 40 of bracket 36, while the card 62 is carried by a bracket 66, which is mounted between the arms 68 of the bracket 36. The terminals 58 and 60 serve to enable the extension of electrical signals from leads 70 to 72, respectively, through the torsion springs 54 and 56 and respective leads 74 and 76, extending through suitable recesses in the standards 46 to the coil 48. The signals applied to coil 48 over leads 70, 74, 72 and 76 are supplied from an alternator through a saturable transformer 78 in a manner similar to that illustrated and described in application Ser. No. 345,354 filed by Johnson on Feb. 17, 1964.

Extending through the shaft 50 and rotatable therewith is a needle shaft 80. The needle shaft 80 is journalled in the respective bearings 82 and 84, carried by brackets 66 and 36 respectively, and serves to rotate the needle 22 carried at one end in response to the movement of the coil 48 and the shaft 50. The bracket 66 also supports the dial 20 by means of spaced apart threaded ears 86 and, in addition, it carries a terminal board 88 best seen in FIGURE 2.

The terminal board 88 supports the saturable transformer 78 and, in addition, carries the potentiometer 30, described in the aforementioned Johnson application, together with a plurality of terminals such as 90 and diodes 92, arranged in a circuit configuration similar to that shown in said application Ser. No. 345,354 filed by Johnson. Thus, terminals 90 enable the transmission of electrical signals from the alternator of an engine through terminals such as 27 and leads 93 and 94 through the primary of the saturable transformer 78.

The potentiometer 30 has one end connected to the juncture of the pair of diodes 92 over lead 95 and the diodes are connected back to back to opposite ends of the secondary of transformer 78, as shown in said Johnson application. The other end of potentiometer 30 is connected to a center tap on the secondary of the saturable transformer 78 over lead 95 and also through lead 72 to one terminal of coil 48. A wiper arm 96 of the potentiometer 30 is connected to other terminal of coil 48 through lead 70, thereby enabling adjustment of the current flow through the meter coil 48 and adjustment of the needle position with respect to dial 20 so as to enable calibration. It will be noted that two resistors, identified as 96 and 98 in the aforementioned Johnson application, have been omitted from the circuit description herein.

Adjustment of the potentiometer arm 96 is achieved by means of an insulating shaft 100 seen extending through from potentiometer 30 through frame member 34 and having rectangular shaft ends 102 for respective engagement with the adjustment knob 28 and the wiper arm 96.

Figure 4:
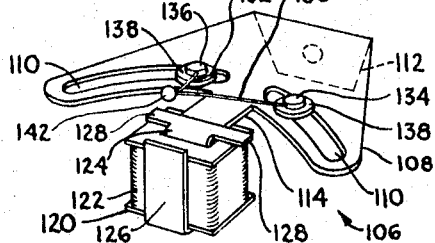
FIGURE 4 is a perspective view of the calibration assembly.

The frame member 34 also supports a calibration assembly 106 including the resonant reed 26. The calibration assembly 106 comprises a non-magnetic mounting bracket 108, having arcuate slots 110 seen in FIGURE 4. The bracket 108 is generally planar and has a depending leg 112 to enable mounting on the frame member 34. It also has extending therefrom along its central axis a planar non-magnetic rib 114, and as seen in FIGURE 3 has a depending L-shaped arm 118 at its end extending through a bobbin 120. A coil 122 is supported on the bobbin 120. Thus, the coil 122 is suspended below the reed 26 by the bracket 108.

A U-shaped magnetic core member 124 is also extended through the bobbin 120 to form the central core of coil 122 carried by the bobbin 120. One leg 126 of the core member 124 extends upwardly in the direction of the reed 26 to form a magnetic circuit therewith. The other leg of the core member 124 has a bent over extension defined by a pair of oppositely directed ears 128 resting on the rib 114 to hold the magnetic member 124 in position.

The reed 26 comprises a simple V-shaped magnetic wire element such as music wire having legs 130 and 132. Legs 130 and 132 are secured to the bracket 108 by means of the clamping screws 134 and 136. The clamping screws 134 and 136 project through respective slots 110 so that they may be arcuately disposed for altering the angle between legs 130 and 132. The legs 130 and 132 each pass through an aperture in the respective screws 134 and 136. A spacer 138 located between the bracket 108 and the leg 130 or 132 is tightened against the leg by means of nuts 140 located beneath bracket 108 when the reed is properly adjusted. A glass bead cemented to the juncture of legs 130 and 132 or other suitable encapsulating material 142 is deposited on the juncture of the legs 130 and 132 to both enhance visibility through the window 24 and provide a large mass segment on the end of the reed.

To calibrate or adjust the reed 26 for a desired frequency, the coil 122 is connected to a source for generating current pulses of a known desired frequency over leads 144 and 146. The coil 122 and the core 124 form a magnetic circuit with the reed 26 and pulse the reed in accordance with the signal frequency. The ends of the legs 130 and 132 are normally adjustably positioned with respect to the clamping screws 134 and 136 under some tension so that the reed 26 is in a position approximating the desired resonant frequency. The screws 134 and 136 are then adjusted in slots 110 to vary the angle between legs 130 and 132 and bring the reed 26 into exact resonance which is noted by a great increase in the amplitude of vibration of the reed, and the reed is clamped in position.

When the tachometer 10 is installed in an automobile by someone desiring to have an indication of the engine speed of his auto, the primary of the saturable transformer 78 is connected with the engine alternator as described in the aforementioned Johnson patent application. In addition, the leads 144 and 146 from coil 122 are connected across a conventional ignition coil ballast resistor 150 illustrated in FIGURE 5. The resistor 150 is in series with the primary 152 of the auto ignition coil and the breaker points 154, which have a conventional capacitor 156 connected in shunt therewith. The connection for the secondary of the ignition coil is omitted since its relationship is not germane to the present invention.

Figure 5:
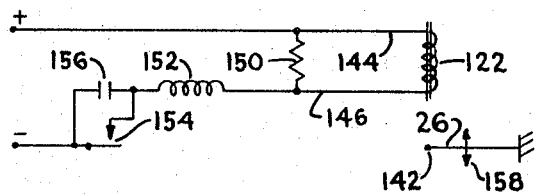
FIGURE 5 is a circuit diagram illustrating a typical circuit arrangement for calibrating the tachometer in an automobile using an alternator.

It will be understood, of course, that depending upon the parameters of the coil 122 and other circuit elements, the coil 122 may be connected at other positions in the circuit shown in FIGURE 5; however, with coil 122 approximating 10 ohms, it may be conveniently connected across the ballast resistor 150 which normally approximates 1 or 2 ohms in order to conveniently meet the objects of the invention. In any event, the breaker points 154 operate at a rate dependent upon the engine speed and signal pulses generated thereby appear across the coil 122.

The coil 122 thus attracts and releases the resonant reed 26 at a rate dependent upon the frequency of operation of the breaker points 154 as shown by the arrow 158. When the rate of operation of the breaker points is equal to the resonant frequency of the reed 26, the reed vibrates with a large amplitude to provide an easily visible movement seen through the window 24 in the dial 20. The operator then knows that the engine speed corresponds to the particular resonant frequency of the reed 26.

The meter needle 22 may at that time be positioned anywhere along the dial 20 depending on the signal frequency of the alternator. In order to bring the needle 22 into a position where it correctly indicates the engine speed, the operator adjusts the knob 28 to vary the voltage at the potentiometer arm 96 and thereby controls the coil 48 to move the meter needle 22 to a position for indicating the frequency corresponding to the resonant frequency of the reed and thereby calibrate the tachometer 10. The leads 144 and 146 may thereafter be disconnected from the breaker points so that even the light load of coil 122 is removed from the circuit and maximum efficiency of the ignition system is then permitted.

The foregoing comprises a description of one embodiment of our invention, whose incentive concepts are believed more adequately defined in the following claims.

What is claimed is:

1. An electric tachometer comprising a meter movement controlled by signals applied thereto from an alternator driven by an engine, a needle adapted to be moved over a dial in accordance with the rate at which signals are applied to said meter movement by said alternator, a support, a potentiometer for controlling the amplitude of the signals from said alternator for altering the relative position of said needle with respect to said dial, a V-shaped reed of magnetic material whose legs are carried by said support with the juncture of said legs being free to resonate at a predetermined frequency dependent on the distance between said support and the juncture of the legs of said reed, means enabling adjustment of the angle between the legs of said reed for controlling the distance between said juncture and said support to adjust said reed to resonate at said predetermined frequency, a coil located adjacent said juncture and energized at a rate corresponding to the speed of said engine for driving said reed at a rate having a known ratio to the speed of said engine, whereby said reed is adapted to resonate at said predetermined frequency when said engine speed corresponds to said predetermined frequency whereafter operation of said potentiometer controls the amplitude of said signals for altering the relative position of said needle in accordance with said engine speed.

2. The tachometer claimed in claim 1 in which said adjustment means enables rotation of the legs of said V-shaped reed about their juncture to maintain said juncture in a predetermined position relative said coil.

3. In an instrument driven by electrical signals for indicating the frequency of said signals and having a housing, the improvement comprising a calibration means for said instrument and mounted in said housing including a V-shaped magnetic wire, a support for carrying the legs of said wire driving means for vibrating said wire, with the juncture of said legs being free to vibrate at a resonant frequency dependent on the distance between said juncture and said support, and a large mass segment at the juncture of the legs of said V-shaped wire with said mass and juncture being located in a visible position and said mass contributing to the visual detection of the resonant vibration of said wire.

4. A calibration arrangement mounted in a housing having an instrument driven by electrical signals for indicating the frequency of said signals, the calibration arrangement comprising a V-shaped wire, driving means for vibrating said wire, a large mass segment at the juncture of said V, and means for adjusting the angle between said legs of said wire to secure small alterations in the resonant frequency of said V-shaped wire for large changes in said angle.

5. In an electric tachometer having housing means and means mounted therein for responding to electrical signals generated in correspondence with the speed of an engine for indicating said speed and means for adjusting the indication provided by said tachometer, a calibrating means for said tachometer mounted in said housing and comprising a coil energized by a signal whose frequency is in a predetermined relation to said engine speed, a V-shaped reed of magnetic material, means mounting said reed with the juncture of said V in a predetermined position adjacent said coil, and means carried by said mounting means for moving the legs of said reed relative said mounting means through an arc having a center of rotation adjacent said juncture for adjusting the distance between said juncture and said mounting means to control the resonant frequency of said reed while maintaining said juncture substantially in said predetermined position.

References Cited by the Examiner

UNITED STATES PATENTS

| | | | |
|---|---|---|---|
| 1,613,727 | 1/1927 | Schmidt | 73—506 |
| 2,349,125 | 5/1944 | Turner | 331—156 |
| 2,615,470 | 10/1952 | Bickley | 317—198 |
| 2,926,303 | 2/1960 | Staggs | 324—70 |
| 3,005,951 | 10/1961 | Gersch | 324—145 |
| 3,064,188 | 11/1962 | Dreiske | 324—80 |
| 3,079,555 | 2/1963 | Daschke | 317—182 |
| 3,181,064 | 4/1965 | Wargo | 324—150 |
| 3,246,259 | 4/1966 | Stanish | 331—156 |

WALTER L. CARLSON, *Primary Examiner.*

RUDOLPH V. ROLINEC, *Examiner.*

M. J. LYNCH, *Assistant Examiner.*